US012009620B1

(12) United States Patent
Dillmann et al.

(10) Patent No.: US 12,009,620 B1
(45) Date of Patent: Jun. 11, 2024

(54) ROUND PLUG HAVING AN ADJUSTMENT ELEMENT

(71) Applicant: IFM Electronic GmbH, Essen (DE)

(72) Inventors: Gerold Dillmann, Wangen (DE); Ralf Withum, Kressbronn (DE)

(73) Assignee: IFM Electronic GmbH, Essen (DE)

( * ) Notice: Subject to any disclaimer, the term of this patent is extended or adjusted under 35 U.S.C. 154(b) by 0 days.

(21) Appl. No.: 18/287,673

(22) PCT Filed: Apr. 21, 2022

(86) PCT No.: PCT/EP2022/060560
§ 371 (c)(1),
(2) Date: Oct. 20, 2023

(87) PCT Pub. No.: WO2022/223697
PCT Pub. Date: Oct. 27, 2022

(30) Foreign Application Priority Data

Apr. 21, 2021 (DE) ......................... 102021110150.6

(51) Int. Cl.
*H01R 13/66* (2006.01)

(52) U.S. Cl.
CPC ................................ *H01R 13/6683* (2013.01)

(58) Field of Classification Search
CPC ............. H01R 13/6683; H01R 13/465; H01R 13/641; H01R 13/6658

(Continued)

(56) References Cited

U.S. PATENT DOCUMENTS 5,093,593 A * 3/1992 Philipp .................. H02K 5/225 310/47
6,249,068 B1 * 6/2001 Knopp ................. H02K 11/215 310/67 R (Continued)

FOREIGN PATENT DOCUMENTS

CN 102216746 A 10/2011
CN 103107457 A 5/2013

(Continued)

*Primary Examiner* — Gary F Paumen
(74) *Attorney, Agent, or Firm* — Patent Technologies, LLC; Robert D. Gunderman, Jr.

(57) ABSTRACT

The invention relates to a round plug (1) for industrial applications of the automation industry. The round plug (1) comprises a circuit board (20) in the interior of the round plug (1), together with: a sensor element (21) disposed on the circuit board (20); an evaluation circuit (22) applied to the circuit board (20); an interface (S); a collar surface (30) on the periphery of the round plug (1); an axis of rotation (31); and a sleeve-type adjustment element (10), which partly rotates about the axis of rotation (31); wherein: the adjustment element (10) consists of an inner sleeve (11), an outer sleeve (12), a spring wire (13) and a magnet (14), and the magnet (14) is inserted into the outer sleeve (12); the adjustment element (10) is pressed onto the round plug (1) such that the inner sleeve (11) is fixedly and interlockingly connected to the collar surface (30) of the round plug (1); an initial position (G) is assumed by—the movable parts of the adjustment element (10), —the outer sleeve (12) and—the magnet (14) when the spring wire (13) is in spring equilibrium; the sensor element (21) can detect the initial position (G) and, when the adjustment element (10) is rotated out of the initial position (G), can distinguish a first direction of rotation (A) from a second, opposite direction of rotation (B).

3 Claims, 3 Drawing Sheets

Figure 1:
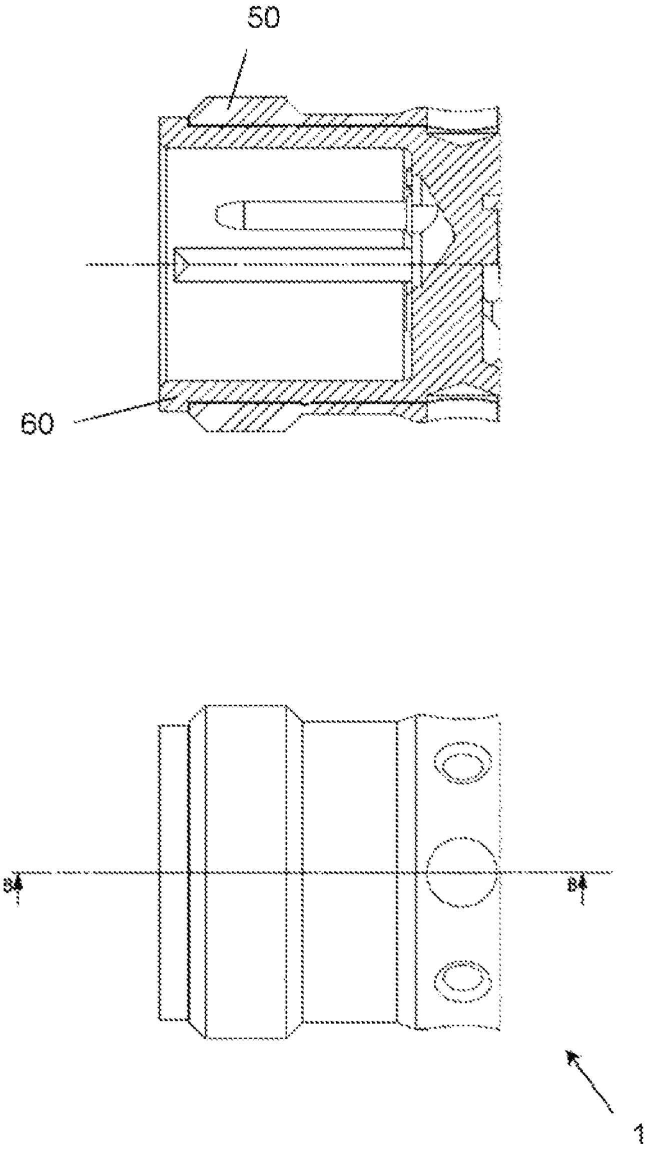

(58) Field of Classification Search
USPC .......................................... 439/38, 488, 76.1
See application file for complete search history.

(56) References Cited

U.S. PATENT DOCUMENTS

| | | | | |
|---|---|---|---|---|
| 9,564,717 | B2 * | 2/2017 | Whetstone ........... | H01R 13/625 |
| 11,431,136 | B2 * | 8/2022 | Southworth ....... | H01R 13/5213 |
| 2008/0252159 | A1 * | 10/2008 | Huck ..................... | H02K 5/225 310/71 |
| 2014/0273608 | A1 | 9/2014 | Whetstone et al. | |
| 2014/0273698 | A1 | 9/2014 | Woodruff et al. | |
| 2018/0048097 | A1 * | 2/2018 | Misgen .................... | G01R 5/00 |
| 2020/0067239 | A1 | 2/2020 | Southworth et al. | |
| 2020/0266590 | A1 | 8/2020 | Tarasinski et al. | |

FOREIGN PATENT DOCUMENTS

| | | | |
|---|---|---|---|
| CN | 105609986 | A | 5/2016 |
| CN | 111937252 | A | 11/2020 |
| DE | 91 07 244 | U1 | 9/1991 |
| DE | 299 04 152 | U1 | 7/1999 |
| DE | 10 2006 005 632 | A1 | 8/2007 |
| DE | 20 2014 101 601 | U1 | 8/2015 |
| DE | 10 2016 207 826 | A1 | 11/2017 |

* cited by examiner

Prior art

ROUND PLUG HAVING AN ADJUSTMENT ELEMENT

The invention relates to a round plug for industrial applications in the automation industry comprising a sleeve-type adjustment element according to claim 1.

Round plugs are generally known. Common round plugs for industrial applications in the automation industry are known from the DIN standard EN 60309.

Electronic switching devices, e.g. optical, inductive, capacitive or ultrasonic sensors, often comprise a round plug as a connection interface. Corresponding industrial connectors of the thread size M8, M12 or M18 can be connected to such a round plug. Electronic switching devices are supplied with power via the round plug and can communicate via the round plug. Switching devices of the above type are usually cylindrically shaped, have a sensory active area on one side and a round plug connection on the other side. An external thread is formed at the outermost circumference of the cylinder in these switching devices. Via the external thread, such devices can be screwed into a threaded bore, screwed through, countered and fastened via the bore.

From the point of view of rationalization, switching devices of the above type often dispense entirely with adjustment or operating elements at the device, since the device can also be maintained remotely without keys, pushbuttons, rotary actuators, etc. Here, settings for parameterization of the device are transmitted directly, i.e. by cable via a connector plug, or indirectly, e.g. by radio to the device.

Adjustment or operating elements often pose a risk of leakage. Pushbuttons, switches or potentiometers require openings in the housing due to their design, which require additional sealing effort.

Nevertheless, an operating or adjustment element which is located directly at the device can be extremely useful for an operator, especially if the installation situation allows it.

When setting up the device or making readjustments, it is usually more convenient for the operator to make the adjustments directly at the device. The adjustments can then be corrected and controlled on site with little effort. Decentralized parameterization of the switching device remotely is usually undesirable or more elaborate in such applications. The setting of the parameters on site is often easier and faster for the operator to implement.

From DE 10 2006 005 632 A1 and DE 91 07 244 U1 round plugs are known that use a pushbutton, a magnetic switch or a potentiometer as an input unit.

From DE 20 2014 101 601 U1, moreover, a round plug having an operating element is known, wherein the operating element has a reed contact that can be actuated by means of a magnet. DE 299 04 152 U1 further discloses a sensor element with a switching element that acts on the switches, e.g. reed switches or Hall switches, provided in the housing, and triggers switching operations when the switching element is rotated. The design shown here is considered to be too complex and too expensive, since at least two switches must be present to generate multiple switching pulses. Furthermore, the switching element can be lost since it is removably plugged onto the housing.

It is the object of the invention to provide a round plug for industrial applications in the automation industry having a rotatable adjustment element in order to be able to operate devices connected to the round plug. The round plug should be able to withstand high industrial requirements for tightness and should moreover be easy and inexpensive to manufacture.

The object is achieved by the coordinated interaction of the adjustment element with the round plug and by the fact that the housing shell of the round plug has no aperture.

Advantageous embodiments of the invention are provided in the subclaims, With embodiments of the invention, an improved round plug can be provided in an advantageous manner.

In the context of the present disclosure, the round plug according to the invention is a round plug having a sensorially detected spring-returning, sleeve-type adjustment element. The adjustment element consists of two sleeves—an inner sleeve and an outer sleeve—a magnet inserted into the outer sleeve and an internal spring wire. The adjustment element is pre-assembled and pressed onto a collar surface of the plug housing in the correct position so that, after pressing, the inner sleeve is firmly and form-fittingly connected to the collar surface of the round plug via an internal collar of the inner sleeve by means of an interference fit. The moving parts of the adjustment element, the outer sleeve and the magnet, assume a basic position in the spring equilibrium of the spring wire, After pressing, they are mounted rotatably about the main axis of the round plug. The moving parts of the adjustment element can rotate in two directions around the shell of the round plug housing and thus can assume a first and a second direction of rotation.

The sensor element is arranged on a printed circuit board inside the round plug. Further components and an evaluation circuit are mounted on the circuit board.

The elongated round plug has a plug interface on one side for connecting corresponding industrial plug connectors. Advantageously, the round plug has a further interface on the opposite side, by means of which the round plug can be connected to electronic switching devices, for example to optical, inductive, capacitive or ultrasonic sensors.

Advantageously, the sensor element is adapted to detect the magnet in the basic position as well as the movement out of the basic position, i.e. the rotational movement, the direction of rotation and the rotational position of the magnet relative to the sensor element and to distinguish the first, from the opposite second direction of rotation. Via this type of state detection, it is possible to transmit values as adjustment parameters via an interface to a device connected to the round plug, for example to a switching device, and to vary these adjustment parameters via a movement of the adjustment element at the round plug and thus to make simple adjustments at a device.

According to one embodiment, the sensor element detects the rotational position of the magnet, converts it into signals via the evaluation circuit and can transmit these signals via the interface at the round plug to a device connected to the interface. Thus, it is possible to make adjustments at a device connected to the round plug by use of corresponding signals.

According to a preferred embodiment, the two sleeves, the inner sleeve and the outer sleeve of the adjustment element, are configured to lay fittingly on top of each other plugged into each other. The two sleeves each have an internal elongated web for holding the spring wire. The spring wire has two elongated parallel ends by means of which the spring wire is pushed onto the webs. The parts of the adjustment element, inner sleeve, outer sleeve, spring wire and magnet, are first fitted into each other and then pressed onto the plug housing. In this state, the ends of the spring wire extend parallel to the axis of rotation. In the basic position, the ends abut parallel the long sides of the two webs. When the adjustment element is rotated out of the basic position, the spring wire exerts a restoring force on the outer sleeve against the direction of rotation, so that the outer sleeve springs back to the basic position by the restoring force of the spring and assumes the basic position in the non-actuated state.

Further features and advantages of the present invention will be apparent from the following figures and exemplary embodiments, by means of which the invention will be explained in more detail by way of example, without limiting the invention.

Figure 2B:
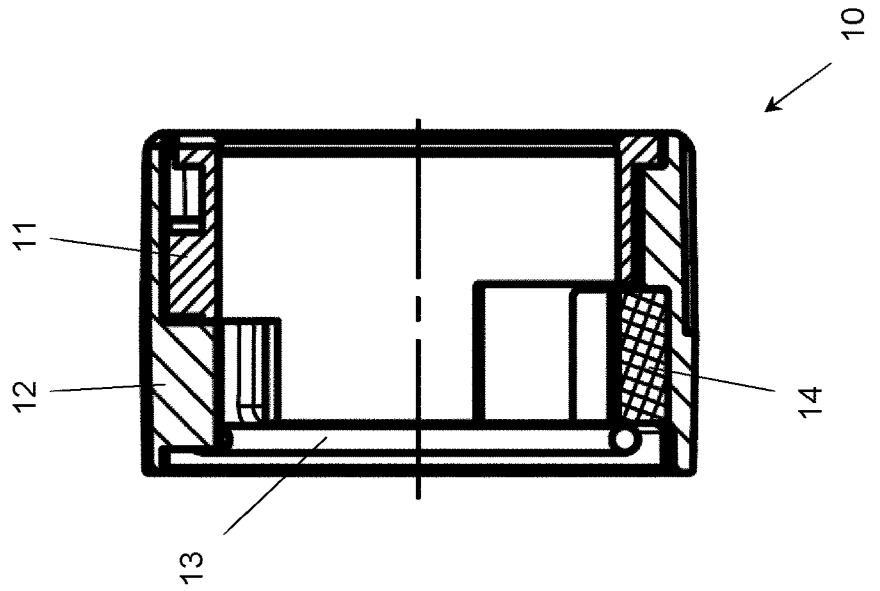
Figure 2A:
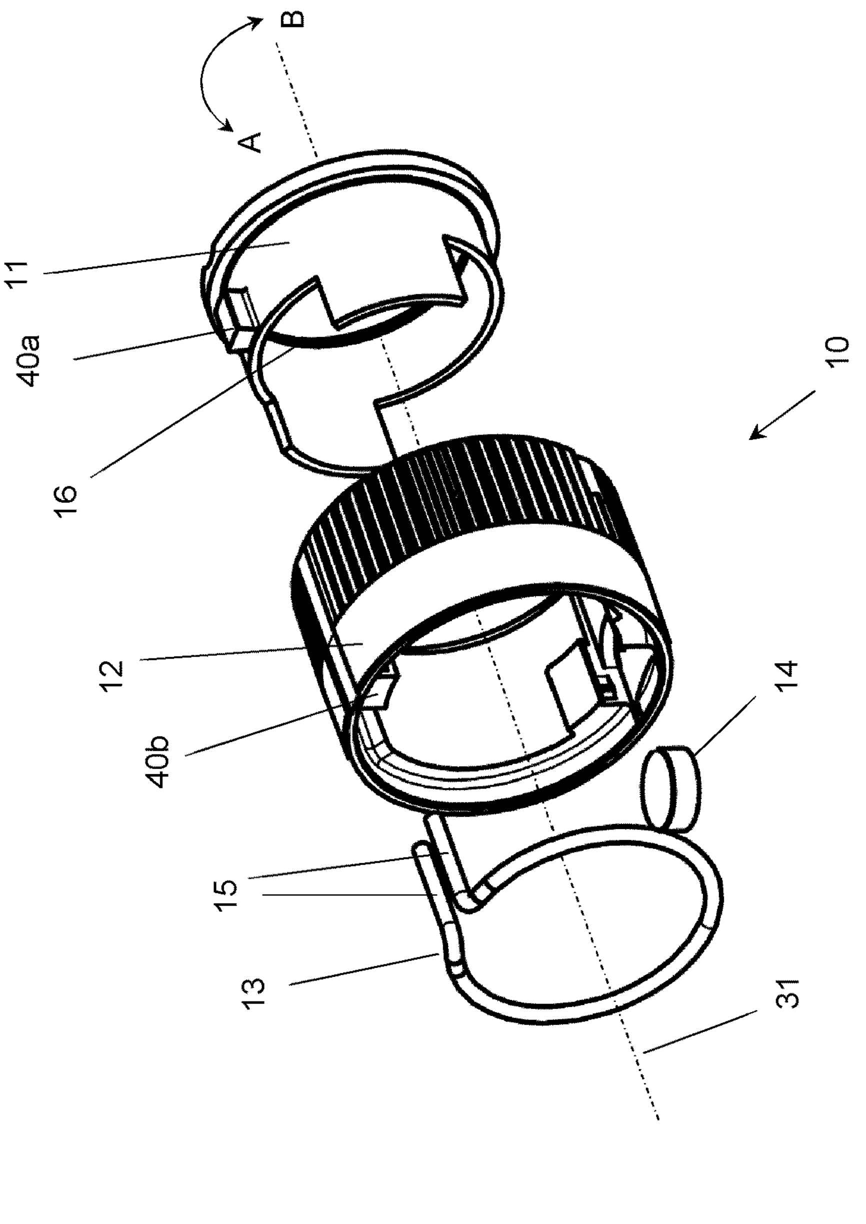
Figure 3:
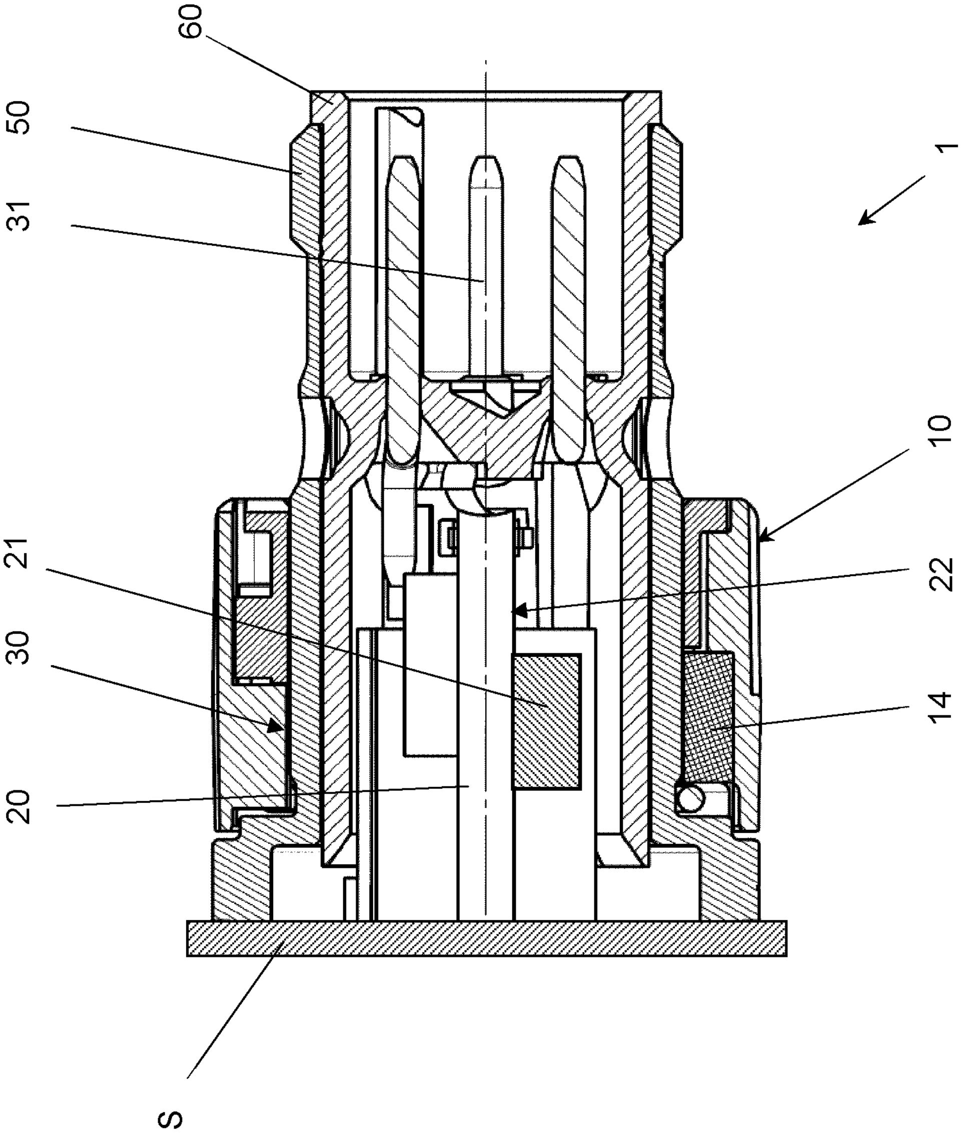

The Figures schematically show:

FIG. 1 a round plug known from the prior art in plan view as ell as in a sectional view, FIG. 2*a* the parts of the adjustment element according to the invention in an isometric exploded view;

FIG. 2*b* the adjustment element according to FIG. 2*a* in the assembled state in a sectional view; and FIG. 3 the round plug according to the invention in a sectional view.

In the following description of the preferred embodiments, identical reference symbols denote identical or comparable components.

FIG. 1 shows a generally known prior art round plug 1 in a top view as well as in a sectional view. Round plugs 1 are known, among others, from the DIN standard EN 60309. Devices, in particular devices for industrial applications in the automation industry, which have high requirements, e.g. with regard to tightness, have a round plug 1 as a connection interface. These devices are supplied with power via the round plug 1 and can communicate via such a round plug 1, e.g. via 10 link. Common industrial connectors of the thread size M8, M12 or M18 can be connected to such a round plug 1. For this reason, round plugs 1 have corresponding external threads for connecting corresponding connectors in cable socket form. Round plugs 1 are usually configured with four poles, with four connector pins, but other combinations and special forms, with three pins or, for example, a stepped blind pin, are also possible. For alignment of the cable socket to the round plug 1, the round plug 1 comprises an elongated plug nose. The outer shape of a round plug 1 is essentially circular and rotationally symmetrical. A prior art round plug 1 consists of an internal pin carrier 60 with corresponding plug pins and a threaded sleeve 50. The pin carrier 60 is inserted into the threaded sleeve and laterally pressed therewith. The threaded sleeve 50 is made either of metal or plastic. Electronic switching devices such as optical, inductive, capacitive or ultrasonic sensors also have a round plug 1 as a connection interface. Round plugs 1 are crimped and/or welded to a corresponding device housing so that the round plug 1 achieves a firm, form fittingly sealed connection with the housing.

FIG. 2*a* shows the sleeve-type adjustment element 10 according to the invention shown in an isometric exploded view. As shown in FIG. 2*a*, the adjustment element 10 consists of an inner sleeve 11, an outer sleeve 12, a magnet 14 and a spring wire 13. The center axes of the sleeves 11, 12 and the spring wire 13 are concentric with each other and form the axis of rotation 31. The sleeves 11, 12 can be plugged into one another in the axial direction and then fittingly lay on top of each other. The magnet 14 is inserted internally in a recess in the outer sleeve 12. The spring wire 13 is simply bent and has two perpendicularly angled, elongated parallel ends 15. With these ends 15, the wire 13 can be pushed onto the two sleeves 11, 12 and is held there. For retention, the two sleeves 11, 12 each have an internal elongated web 40*a*, 40*b*. The inner sleeve 11 has an inner collar 16 with which the sleeve 11 can be applied to a corresponding collar surface 30, so that the sleeve 11 is firmly and form-fittingly connected to this collar surface 30. In addition, the sleeve 11 comprises two protruding tabs which, upon rotation of the outer sleeve 12 about the inner sleeve 11, together with internal protrusions of the outer sleeve 12, act as end stops. The outer sleeve 12 is provided with a corrugation with good grip over half of the shell.

FIG. 2*b* shows the adjustment element 10 according to FIG. 2*a* ire the assembled state in a sectional view. The outer sleeve 12, the rotating sleeve 12, is mounted around the inner sleeve 11, the press sleeve 11 rotatable about the axis of rotation 31. If the rotating sleeve 12 is rotated about the press sleeve 11, the spring wire 13 widens accordingly and causes a force against the respective direction of rotation. In the rest position, in spring equilibrium of the wire 13, the rotating sleeve 12 assumes a basic position G. The rotating sleeve 12 can be rotated in two directions. In a first direction of rotation A and in the direction of rotation B opposite to direction of rotation A. The magnet 14 inserted into the outer sleeve 12 rotates together with the outer sleeve 12 as it rotates.

FIG. 3 shows the round plug 1 according to the invention together with the adjustment element 10 of FIGS. 2*a*, 2*b* in a sectional view. The round plug 1 is essentially circular and rotationally symmetrical, has a threaded sleeve 50 with an elongated collar surface 30, a pin carrier 60 with plug pins, an adjustment element 10, a printed circuit board 20 which can be fastened to the pin carrier 60 and has an evaluation circuit 22 and a sensor element 21 applied onto the printed circuit board 20. Here, the diameter of the collar surface 30 is designed to be larger than the external thread of the threaded sleeve 50. This allows the adjustment element to be pushed over the external thread and pressed onto the collar surface 30. During pressing, the internal collar 16 of the inner sleeve 11 assumes a fixed, form-fitting connection with the collar surface 30. The threaded sleeve 50 shown here is made of metal, but can analogously in another embodiment also be made of plastic. The housing shell of the round plug has no aperture, so that the round plug is intrinsically configured sealed and no moisture can penetrate into the housing from the outside. Bore holes can be provided at the round plug 1 for an LED status display—as shown schematically in FIG. 3. These are radially sealed on both sides via the pin carrier 60. However, these can also be omitted and are not absolutely essential according to the invention. Rather, they are optional and to be seen as an additional construction variant.

The sensor element 21, which is fixedly arranged on the printed circuit board 20, detects the magnet 14 in the basic position G. If the outer sleeve 12 is rotated, the inserted magnet 14 also rotates with it, Two directions of rotation, direction of rotation A and direction of rotation B, are possible. The sensor element 21 can distinguish a first direction of rotation A from a second, opposite direction of rotation B out of the basic position G. Furthermore, the sensor element 21 can convert the rotational position of the magnet 14 into signals via the evaluation circuit 22 and output these signals via the interface S at the round plug 1. Via the interface S, the round plug 1 can be connected to devices, for example, to electronic switching devices such as optical, inductive, capacitive or ultra sonic sensors. Via this type of position detection of the magnet 14, it is possible to transmit status values as adjustment parameters via the interface S to a connected device, as well as to transmit these adjustment parameters via a rotation of the outer sleeve 12.

A robust round plug is provided which meets high industrial requirements in terms of tightness, IP69K. This is possible due to the encapsulated design and the structure of the round plug. By means of a rotatable adjustment element, which can be assigned to the round plug, simple parameterization tasks can be carried out directly via the round plug. The adjustment element is firmly connected to the housing wall of the round plug. This has the advantage that the adjustment element cannot be lost during normal use and remains at the round plug.

The decisive advantage over conventional round plugs is that the round plug according to the invention has an adjustment element which has a sensorially detected element which can be rotated about the round plug housing and by means of which signals for controlling connected devices can be generated.

Further advantages result from the fact that the round plug, according to the modular principle, can be formed as a standardized round plug assembly, compatible and identical across a wide product range. The assembly does not have to be developed specifically for a single product or device, but can be connected to corresponding products or devices in any manner due to the interface. Advantages result above all from the manufacturing process, which is standardized across the entire portfolio.

LIST OF REFERENCE SYMBOLS

1 round plug
10 sleeve-type adjustment element
11 inner sleeve, press sleeve
12 outer sleeve, rotating sleeve
13 spring wire
14 magnet
15 ends
16 collar
20 printed circuit board
21 sensor element
22 evaluation circuit
30 collar surface
31 axis of rotation
40 web
50 threaded sleeve
60 pin carrier
G basic position
A first direction of rotation
B second direction of rotation
S interface

What is claimed is:

1. A round plug (1) for industrial applications in the automation industry, comprising a printed circuit board (20) in the interior of the round plug (1) with a sensor element (21) arranged on the printed circuit board (20), an evaluation circuit (22) applied onto the printed circuit board (20), an interface (S), a collar surface (30) located at the circumference of the round plug (1), an axis of rotation (31) and a sleeve type adjustment element (10) partially rotating about the axis of rotation (31);

wherein the sleeve-type adjustment element (10) comprises an inner sleeve (11), an outer sleeve (12), a spring wire (13) and a magnet (14), and wherein the magnet (14) is introduced into the outer sleeve (12); the adjustment element (10) being pressed onto the round plug (1) in such a way that the inner sleeve (11) is firmly and form-fittingly connected to the collar surface (30) of the round plug (1); wherein the movable parts of the adjustment element (10), the outer sleeve (12) and the magnet (14) assume a basic position (G) in the spring equilibrium of the spring wire (13); wherein the sensor element (21) is able to detect the basic position (G) and can distinguish a first direction of rotation (A) from a second, opposite direction of rotation (B) when the adjustment element (10) is rotated out of the basic position (G).

2. The round plug (1) according to claim 1, wherein the sensor element (21) is able to convert the rotary position of the magnet (14) via the evaluation circuit (22) into signals and output these signals via an interface (S) at the round plug (1).

3. The round plug (1) according to claim 1, wherein the sleeves (11, 12) of the adjustment element (10) are formed in such a way that they lie on top of one another and the sleeves (11, 12) each have an internal, elongate web (40*a*, 40*b*) for holding the spring wire (13), the spring wire (13) has two elongate parallel ends (15) which extend parallel to the axis of rotation (31), and in the basic position (G) the ends (15) abut parallel the longitudinal sides of the two webs (40*a*, 40*b*), and when the adjustment element (10) is rotated out of the basic position (G), the spring wire (13) exerts a force against the direction of rotation (A, B) on the outer sleeve (12).

* * * * *